(12) United States Patent
Allen et al.

(10) Patent No.: US 11,924,063 B2
(45) Date of Patent: *Mar. 5, 2024

(54) SYSTEM AND METHOD FOR DYNAMIC TIME ESTIMATES

(71) Applicant: PAYPAL, INC., San Jose, CA (US)

(72) Inventors: Joshua Allen, Moraga, CA (US); Joshua Van Blake, Walnut Creek, CA (US); Archana Murali, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,233

(22) Filed: Feb. 13, 2023

(65) Prior Publication Data

US 2023/0198864 A1    Jun. 22, 2023

Related U.S. Application Data

(63) Continuation of application No. 17/563,512, filed on Dec. 28, 2021, now Pat. No. 11,606,266, which is a continuation of application No. 16/727,894, filed on Dec. 26, 2019, now Pat. No. 11,265,227.

(51) Int. Cl.
| | |
|---|---|
| *H04L 41/5009* | (2022.01) |
| *G06F 9/48* | (2006.01) |
| *H04L 41/50* | (2022.01) |
| *H04L 41/5067* | (2022.01) |

(52) U.S. Cl.
CPC ........ *H04L 41/5009* (2013.01); *G06F 9/4881* (2013.01); *H04L 41/5058* (2013.01); *H04L 41/5067* (2013.01)

(58) Field of Classification Search
None
See application file for complete search history.

(56) References Cited

U.S. PATENT DOCUMENTS

| | | |
|---|---|---|
| 8,271,336 B2 | 9/2012 | Mikurak |
| 8,413,161 B2 | 4/2013 | Blackburn et al. |
| 8,560,366 B2 | 10/2013 | Mikurak |
| 9,794,334 B2 | 10/2017 | Wong et al. |
| 10,671,361 B2 | 6/2020 | Li et al. |
| 10,997,251 B2 * | 5/2021 | Tran ...................... G06Q 50/14 |
| 11,265,227 B2 * | 3/2022 | Allen .................... G06F 9/4881 |
| 2004/0139433 A1 | 7/2004 | Blythe et al. |
| 2008/0112423 A1 | 5/2008 | Christenson |

(Continued)

*Primary Examiner* — Ranodhi Serrao
(74) *Attorney, Agent, or Firm* — HAYNES AND BOONE, LLP

(57) ABSTRACT

Aspects of the present disclosure involve systems, methods, devices, and the like for obtaining real-time estimates. In one embodiment, a novel customizable, transferable system architecture is presented that enables the characterization of a task, designated for time estimate, into steps or processes. The characterization may occur using the novel architecture which introduces an estimates service module that can provide an initial timing estimate by obtaining a composite time estimate of all steps. Timing of each of the steps can be predicted using a job scheduling enterprise designed to model the job or step. In another embodiment, delays are captured by time estimate monitors which can provide the alerts and delta time differences. Such alerts and time differences can be updated and presented to the user.

20 Claims, 6 Drawing Sheets

(56) References Cited

U.S. PATENT DOCUMENTS

| | | |
|---|---|---|
| 2011/0251868 A1 | 10/2011 | Mikurak |
| 2012/0089410 A1 | 4/2012 | Mikurak |
| 2012/0131591 A1 | 5/2012 | Moorthi et al. |
| 2012/0259722 A1 | 10/2012 | Mikurak |
| 2012/0330710 A1 | 12/2012 | Hauser et al. |
| 2013/0014114 A1 | 1/2013 | Nagata |
| 2014/0222610 A1* | 8/2014 | Mikurak ............ G06Q 30/0269 705/26.5 |
| 2014/0288989 A1 | 9/2014 | Goeppinger |
| 2015/0215397 A1 | 7/2015 | Wong et al. |
| 2015/0227890 A1* | 8/2015 | Bednarek ........... G06Q 10/0833 705/26.81 |
| 2016/0162936 A1 | 6/2016 | Khalil |
| 2016/0224392 A1 | 8/2016 | Clarke et al. |
| 2017/0006135 A1 | 1/2017 | Siebel et al. |
| 2017/0149875 A1 | 5/2017 | Iyengar et al. |
| 2018/0018610 A1 | 1/2018 | Del Balso et al. |
| 2018/0191867 A1 | 7/2018 | Siebel et al. |
| 2018/0322431 A1 | 11/2018 | Folck |
| 2019/0052728 A1* | 2/2019 | Cheng ..................... H04L 67/62 |
| 2019/0265971 A1 | 8/2019 | Behzadi et al. |
| 2020/0117690 A1 | 4/2020 | Tran et al. |
| 2020/0409754 A1 | 12/2020 | Li et al. |
| 2021/0203571 A1* | 7/2021 | Allen .................. H04L 41/5058 |
| 2021/0256070 A1* | 8/2021 | Tran .................. G06F 16/90332 |
| 2021/0293555 A1* | 9/2021 | Roherty ............. G01C 21/3697 |

* cited by examiner

SYSTEM AND METHOD FOR DYNAMIC TIME ESTIMATES

CROSS REFERENCED TO RELATED APPLICATIONS

The present application is a continuation application of U.S. patent application Ser. No. 16/727,894, filed Dec. 26, 2019, and U.S. patent application Ser. No. 17/563,512, filed Dec. 28, 2021, both are incorporated in reference in its entirety.

TECHNICAL FIELD

The present disclosure generally relates to data analytics, and more specifically, to a system and method for performing data analytics to determine a dynamic time estimate on a time of arrival.

BACKGROUND

Nowadays with the proliferation of electronics, users are constantly relying on their electronics for access to social media, transacting, authenticating, messaging, communicating, etc. However, with such reliance comes the desire to remain connected and receive updates on transactions taking place. For example, a user is on a laptop and is getting a package delivered, he/she would want to understand when the package will arrive. As another example, a user is stuck in traffic, the user would want an alternate route and time to his/her destination. Still as another example, a user wants to transfer funds to another user, the user would want to know when the transferred funds would be available for pick-up by the another user. Such timing details generally get addressed with the use of a provider application which can deliver a general time estimate. However, general time estimates can be misleading and can result in wasted time and money for the user and credibility for a provider. Therefore, it would be beneficial to have a system and method for proving real-time, reliable and dynamic time estimates.

Figure 1B:
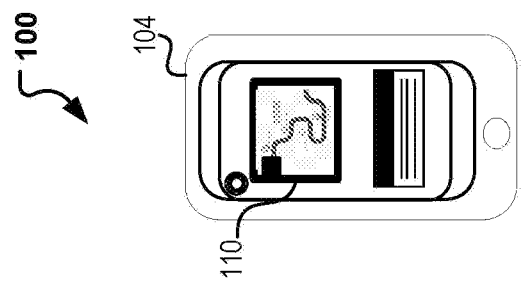
FIGS. 1A-1C illustrates exemplary uses of timing applications.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for obtaining real-time estimates. In one embodiment, a novel, customizable, transferable system architecture is presented that enables the characterization of a task, designated for time estimate, into steps or processes. The characterization may occur using the novel architecture which introduces an estimates service module that can provide an initial timing estimate by obtaining a composite time estimate of all steps. Timing of each of the steps can be predicted using a job scheduling enterprise designed to model the job or step. In another embodiment, delays are captured by time estimate monitors which can provide the alerts and delta time differences. Such alerts and time differences can be updated and presented to the user.

Figure 1A:
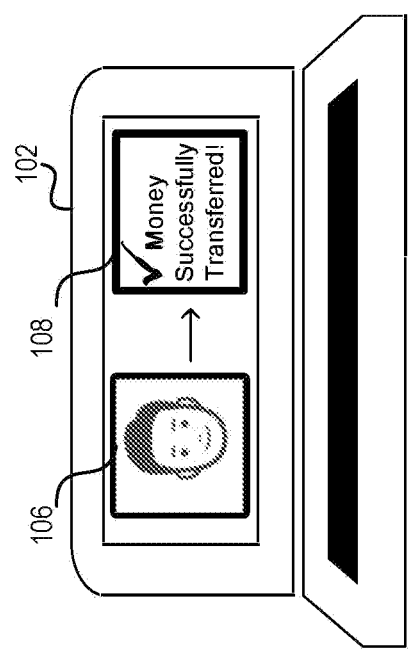
Figure 1C:
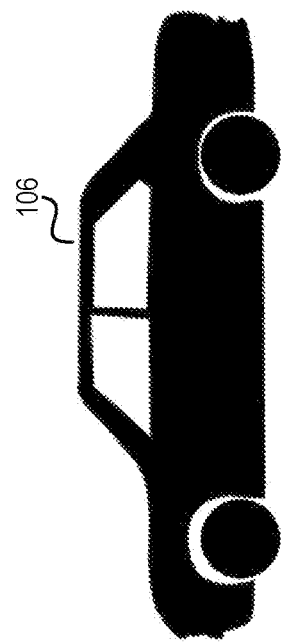

Nowadays with the proliferation of electronics, users are constantly relying on their electronics for access to social media, transacting, authenticating, messaging, communicating, etc. However, with such reliance comes the desire to remain connected and receive updates on tasks taking place. FIGS. 1A-1C illustrates exemplary applications of data analytics necessitating time estimates. In particular, FIGS. 1A-1C provide exemplary instances of tasks occurring where obtaining more precise time estimate is essential. For example, turning first to FIG. 1A, a money transfer application is presented where a user 106 on a personal device 102 is transferring funds on an application 108, and having knowledge on the timing of the transfer is paramount.

The personal device 102 may be a tablet, iPad, cell phone or the like. For exemplary purposes, personal device 102 can be a laptop. The personal device 102 may be used for web browsing, video streaming, bill payments, and online purchases. Additionally, the personal device 102 may be equipped with applications that enable the user to make purchases and transfers using payment provider applications and/or a digital wallet. Further, the personal device 102 may be capable of making phone calls and communicating with one or more other communications devices using a cellular network, Wi-Fi, Bluetooth, BLE, NFC, WLAN, etc. The communication can enable the transmission of information from a user account to a secondary source. For example, the personal device 102 can be used to communicate with a service provider device or system. In the communication, the user 106 may use an application from the service provider to make a monetary transfer.

In one embodiment, the money transfer may include the transmission of funds from the user's account to another account or entity. For example, consider an instance where the money transfer from the user 106 is to another person (e.g., relative) located in a foreign country. In this instance, the funds may not be immediate and may require the use of an associate bank, personal delivery, and/or the pick-up at a specified location. As such, knowledge of when the funds be available for pick-up, delivered, etc. by the another person are needed and the user 106 should have such insight. In addition, if there is a delay and the initial time estimate needs to be updating, the user 106 should be provided with a dynamic update as the transfer progresses and becomes available for pickup.

Turning next to FIG. 1B, another timing application is presented where a user device 104 is being used to determine a route and arrival timing of a package. As illustrated, the application 110 illustrates several steps and/or stops that may take place between order, shipment, and delivery of the package. In one embodiment, the tracking can occur on the user device 104. The user device much like the personal device 102 can be a computing device such as a tablet, iPad, cell phone or the like. For exemplary purposes, user device 104 can be a smart phone. The user device 104 as illustrated may be used for web browsing, video streaming, bill payments, and online purchases. Additionally, the user device 104 may be equipped with applications that enable the user to make purchases and monetary transfers using a payment provider application and/or a digital wallet. Further, the device 104 may be capable of making phone calls and communicating with one or more other communications devices using a cellular network, Wi-Fi, Bluetooth, BLE, NFC, WLAN, etc. The communication can enable the transmission of information from a user account to a secondary source, entity, user account, etc. For example, as illustrated here the user device 104 may be used to purchase and track its shipment.

Like in the monetary transfer application, this type of task uses a timing estimate application to determine the whereabouts of an item. For FIG. 1A, tracking was with regards to an availability of funds and the timing associated with the availability. At FIG. 2B, tracking was with regards to the shipment of a package and the timing associated with the arrival of the package. Again, as the package moves through the shipping process, delays, holidays, weekends, and other circumstances may arise that may lead to a change in the original timing estimate. As such, the arrival timing of the package may need intentional updating, with tracking and timing being important. Thus, it would be beneficial to have a system and method that enables dynamic timing updates.

Turning next to FIG. 1C, yet another application of a task necessitating time of arrival estimates is presented. In particular, FIG. 1C illustrates a vehicle 106 (manual, autonomous, or semi-autonomous) which can use mapping applications for determining a route to a specified destination. In the mapping application, various routes may be presented with corresponding times of arrival. The vehicle, much like the personal device 102 and user device 104 is also able to communicate with one or more other communications devices using a cellular network, Wi-Fi, Bluetooth, BLE, NFC, WLAN, etc. The communication can enable the transmission of information from a user account to a secondary source, entity, user account, etc. For example, as illustrated here the vehicle 106 may communicate with a global positioning system (GPS) for determining a route. Additionally, the vehicle 106 may be equipped with numerous sensors made for communicating and computing information which may be used in conjunction with the mapping application.

As indicated, the vehicle mapping and travel use a timing estimate application for use to determine a best route to take to a pre-determined location. However, there may exist some instances where an accident occurs, or construction is currently taking place. In such instances, the mapping application may need to update on the accident. Nevertheless, estimates and routes may be anticipated if construction, or other road closures are known ahead of time enabling time estimates to become more granular. Accordingly, historical or other known or anticipated data may be used ahead of time and provided in the time estimate as opposed to updates that may originally lead the vehicle 106 in a certain direction that later encounters the delay. As such, it would be beneficial to have a system and method that can provide a dynamic timing estimate with anticipated events for a more exact time of arrival.

To provide such system, intermittent steps and processes between timing request and estimated time should be identified such that any updated occurring between the steps may be considered and updated dynamically. In other words, a lifecycle of the work within the schedule for the estimated time requested is needed and used to provide the estimate. Thus, each step in the process (or lifecycle) should be configurable with regards to when it will occur and in what order, such that the timing provided is optimal. In addition, block dates, periods of time, holidays, delays, outages, etc., should be considered and included when providing the timing estimate.

Figure 2:
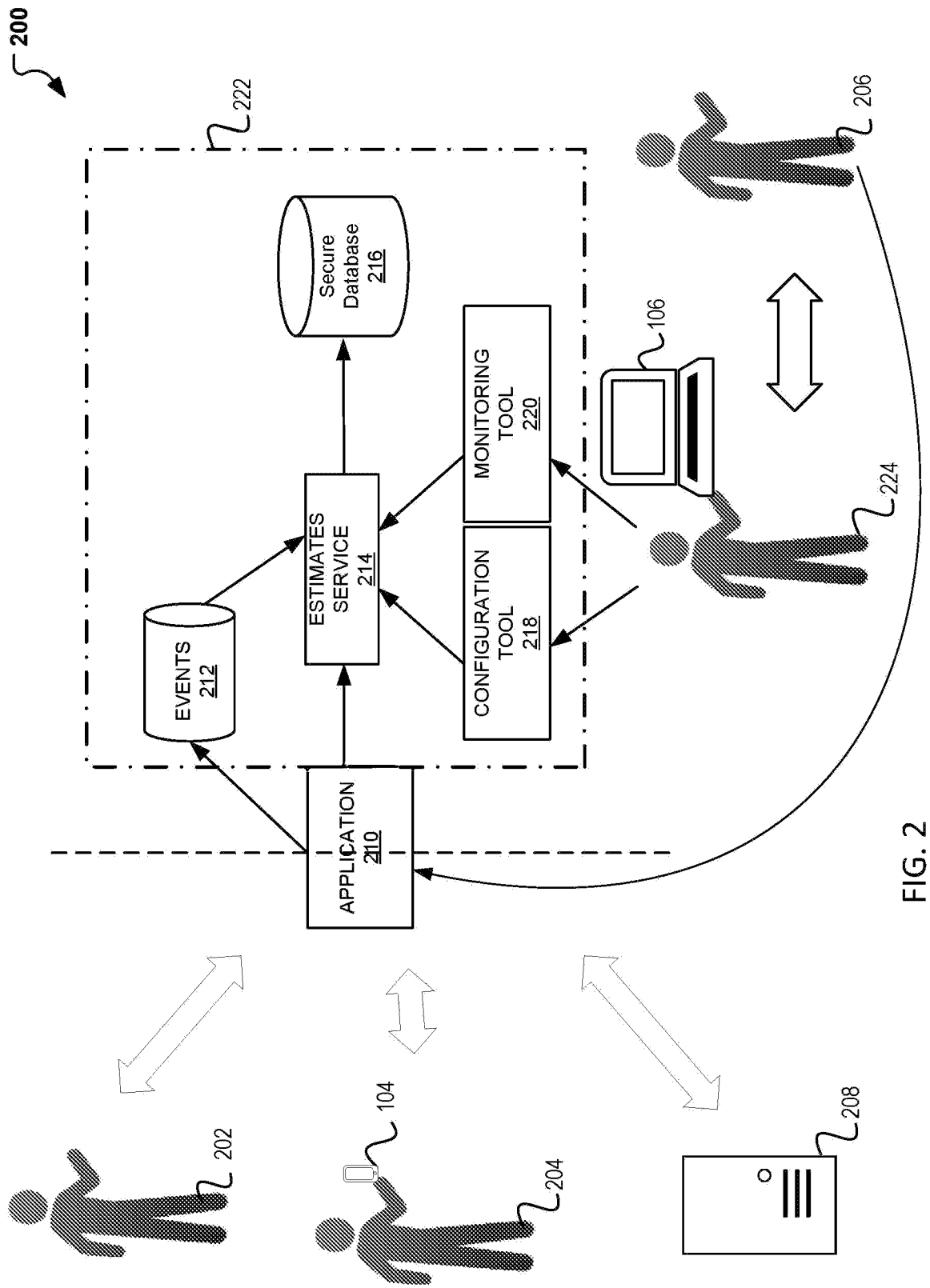
FIG. 2 illustrates a block diagram illustrating an exemplary architecture for dynamic timing estimates.

FIG. 2 is introduced to illustrate a block diagram of an exemplary architecture for providing such timing estimate. In particular, FIG. 2 illustrates a block diagram of a timing system 200 for providing dynamic timing estimates. In one embodiment, interacting with the timing system 200 begins with a user 202, merchant 204, partner 206, device 208 (e.g., vehicle 106) or the like executing on application 210 for determining a timing estimate. Executing can occur through the use of an application of a user device 104, a dashboard on a personal device 106, using voice, biometric, or other sensory control, and/or dynamically via the device. The application can be a mapping application, a monetary transfer application, a service provider application, or other application including its corresponding systems, subsystems, and networks associated with the application for performing the task requested. The application 210 obtains an input to execute on a task (e.g., monetary transfer, package tracking, direction mapping, etc.) and proceeds with a communication with an estimate platform 222 for initiating the calculation and outputting of a timing estimate back to the application and to the user 202, 204, 206, and/or device 208. In one embodiment, communication with the estimate platform 222 can include a communication with at least an events database 212 and estimates service module 214. The estimates service module 214 may be a component designed to create the estimate and track it in a secure database 216 the timings and steps associated with the task, for ongoing monitoring. To create the estimate, the estimates service module 214 will consider the configuration of schedules, steps, processes, holidays, closures, outages, etc., provided and presented for use in the task lifecycle. Such configurations may be obtained from the configuration tool 218 which includes the various steps, processes, constraints included in the task requested. In one embodiment, these steps, processed, constraints, etc. included in a lifecycle may be included in the configuration tool 218 and added manually by an operator 110 via a device 106. In another embodiment, the configuration tool 218 may be updated dynamically though the use of various algorithms designed to map and test various steps, processed, and timing outputs for a plurality of tasks available to be performed by the estimation platform 222. In some embodiments, the configuration tool 218 can be updated directly by a partner 206 or other user who uses the estimation platform 222 for providing a dynamic timing estimate for a task not previously defined or included in the timing system 200. Therefore, timing system 200 can include estimate platform 222 which may work as a stand-alone for any merchant, partner, or other service provider with a need for obtaining reliable and dynamic timing estimates. Accordingly, the application 210 can also vary and the estimate platform 222 can function as a standalone design to plug-in to any system.

As indicated, the secure database 216 can be used for tracking estimates defined by the estimates service module 214. In addition, the secure database 216 may also be used to ensure persistent configurations are used and that schedules, steps, holidays, outages, estimates, etc. are all adequately stored. For tracking, in one embodiment, the monitoring tool 220 can use the information stored in the secure database 216 to set alerts when steps or processes are not within their designated or predetermined timing window. For example, if a process is taking too long, an alert may be sent and new analytics can cause, time updates and reasoning to may be determined. Therefore, the monitoring tool 220 may use the intelligence and analytics determined and communicate to an operator 224, partner 206, or other with a device 106 that a problem exists. A report, email, or other communication may be sent on the delay or at least a notification transmitted detailing that an outage or other error may exist on their end. In addition, if the partner and the service provider, or application entity have a service level agreement (SLA) in which an event or step is to be executed in a certain amount of time, and a variance in the SLA exist, then the report or communication may also be sent to the partner 206 for correction.

In some instances, a partner, or other user outage may be routine and intentional. In such instances, the outages may be configured explicitly in the configuration tool 218 such that future estimates may include the outage and timing may be modeled accordingly. In other instances, if the outage is not intentional but may extend over a period of time, the configuration tool 218 may also be updated such that for that period of time, estimates provided are updated to include the outage. Additionally, or alternatively, the configuration tool 218 may also use the outage information for identifying another step, process or alternative that may provide a faster or more efficient estimate. Note that in addition to outages, holidays, delays, upgrades, weekends, etc., may also be included and updated in the configuration tool 218 such that they are included in the timing estimate provided.

In some embodiments, the partner 206, vendor, operator 224, merchant 204, or the link can push the outage to the estimation tool. That is to say, if they know an outage is occurring, such occurrence may be communicated to the monitoring tool 220 so that the estimates service module 214 may update the estimate accordingly. Likewise, the partner 206, vendor, operator 224, merchant 204, or other user or device can also clear the outage or error from the estimate platform 222.

As the estimates service module 214 is managing the timing estimate request received from the application, a series of events occur which align with the overall estimate and specifically with the steps (e.g., substimates) that may aggregate to make-up the entire estimate. These series of events are recorded in the events component 212 and as the event is recorded, timing and other relevant information may be relayed to the estimates service module 214, which can lead to a recalculation of the remaining time for a dynamic timing estimate update. Thus, as events occur and a timing estimate is updated, the information and updates may become available to the user 202-208 via the application or proactively as a pop-up notification, email, text, hyperlink, SMS, etc. In some instances, the events can include those occurring within the application, external and in the real-world, and any combination thereof resulting in the events being captured and recorded in the events component 212 and leading to updated and report to the estimates services module 214. In addition, as the event or activity concludes, the update may also be transmitted to the estimates service module 214 and when updated back to the application for an update to the user 202-208. Note that in some instances, updates and estimates can also change based on the transaction type and scale. For example, in the routing example, water, air, and auto may all become available for transport. As such, road constructions may require updates made to the auto route but do not impact air or water transport routes. Thus, adjustments may be independently made, dynamically made (e.g., as an accident or other delay arises), scheduled (e.g., holiday, scheduled outage, 6-month construction project, etc.), or a combination thereof.

Figure 3:
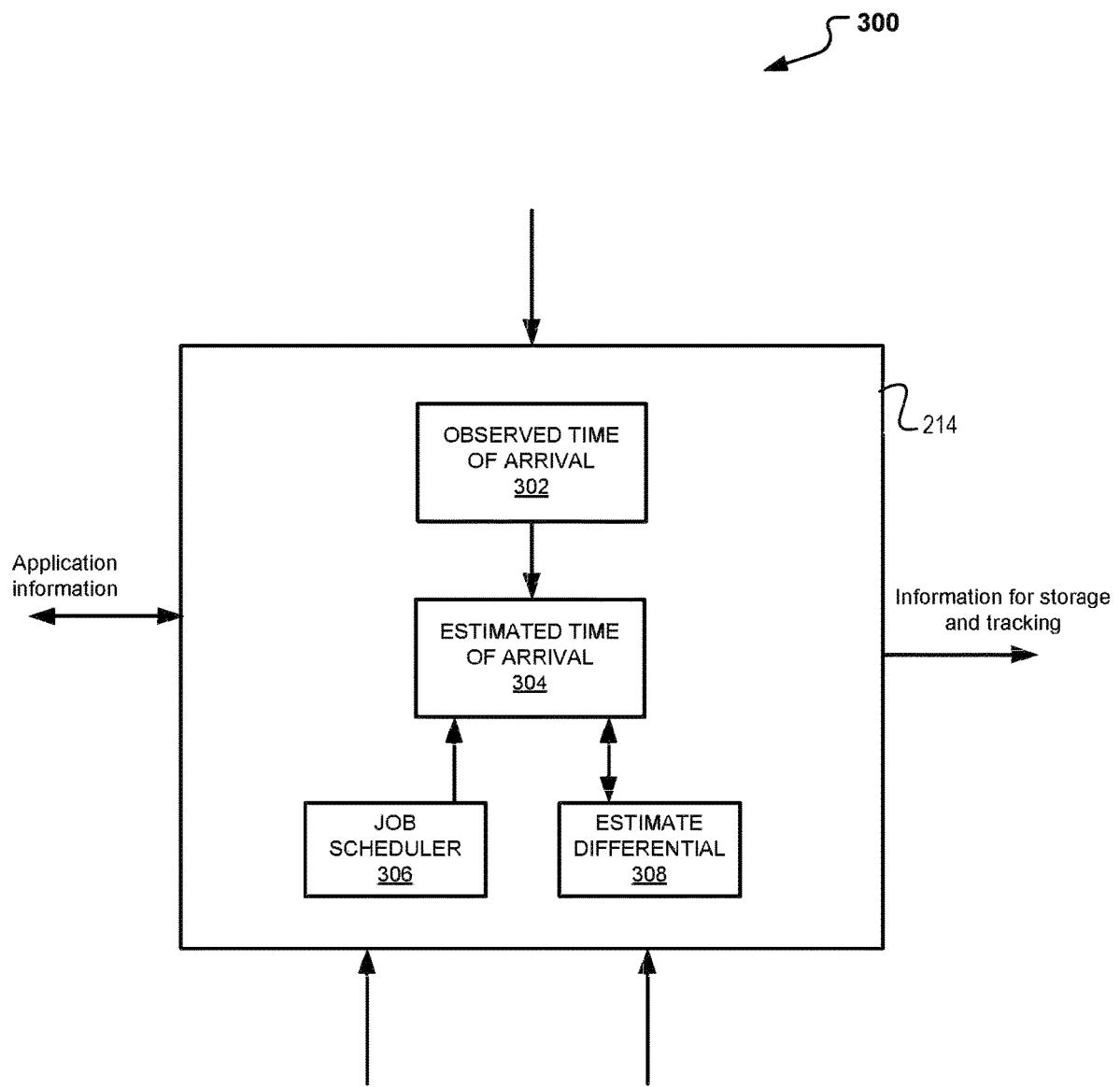
FIG. 3 illustrates exemplary block diagram of the estimates service module use in dynamic timing estimates.

To ensure the updates are adequately captured and reported, the estimates service module 214 provides an initial estimate and then may later provide the dynamic updated time estimate based in part on the events encountered. Turning next to FIG. 3, details on how such estimates and updates occur are presented. In particular, FIG. 3 illustrates an exemplary block diagram of the estimates service module 214 used in providing dynamic timing estimates. As illustrated, providing dynamic timing estimates includes the input and update from various components and modules. Such inputs may be used in generating an initial estimated time of arrival (for a task) or may be used in creating an update of the estimate time using at least the observed events and execution time thereof.

To obtain an initial estimate of time, an estimate time of arrival component 304 may be used. This estimate time of arrival component 304 may function by obtaining the inputs from the configuration tool 218 and inputs from job scheduler 306. The job scheduler 306 is scheduling technology that can break down the lifecycle of the task needing the estimate to a series of processes and steps such that each step breaks down to simple steps whose individual timing may be determined. To determine the individual timings, each process/step within the job scheduler 306 may be simulated in order to predict perspective times by which each of the individual processes will be completed. That is to say, without running the task (e.g., executing on a job) at the partner, merchant, service provider, or other entity, the job scheduler 306 is able to simulate the task and predict a time of completion. Thus, the job scheduler can work to make time predictions (substimates) on the steps occurring, while considering SLAs, holidays, outages, etc., historical data, and configurations provided by the configuration tool 218 to make an initial estimated time of arrival or completion. Jobs and configurations may be specified at the application platform and/or through a control panel that provides the job scheduler 306 in the estimates service module 214 the configurations and information to obtain the estimate. In one embodiment, the steps may be selected at least based in part, on those providing a best timing estimate.

In one embodiment, the jobs schedulers 306 can work in tandem with the schedule of steps to model timing, and outage, holiday, and an amount of time the step will take using the job scheduler logic. That is to say, the job scheduler 306 can be used to schedule batch job processed and run reports on execution times of jobs/steps. In addition, the job scheduler 306 may also be run periodically to clean up tasks and can be repurposed to simulate imitation jobs that simulate real world events that may occur both inside and outside the application. In one embodiment, cron or other computer-executable commands may be used to execute and compute the process for scheduling at the specified times. In another embodiment, the job scheduler 306 can model each step as designed and configured per partner such that in performing the simulation, the job scheduler 306 can predict the timing of those configurations specified without needing to run the actual job. Note that as various permutations exist and partners are available, the job scheduler can model and make predictions accordingly. Also note, that in addition to the per process time estimates, global configurations may be set (e.g., holidays, outages, etc.) such that the lifecycle and corresponding step is updated. For example, if a process happens during a holiday, then the completion or time estimate should consider this and should provide a timing that accounts for the holiday. Still note further that the steps within an initially set configuration can vary and be updated or modified such that the estimated time provided by the overall estimation platform 222 is flexible and dynamically adaptable to a user's needs. Timing updates can therefore be provided with an initial timing estimate and then later updated as the task moves through the flow of the lifecycle under consideration.

To make these updated estimates, the estimates service module 214 may also include an observed time of arrival component 302. The observed time of arrival component 302 may be used for updating estimates and recording/storing events. As indicated, completion and initial time predictions may vary as events are observed as the events database 212 receives and transmits the information to the estimates services component 214. Therefore, the observed time of arrival component 302 may be used to not only measure the time, but also identify that a difference exists. Therefore, as an outage is observed, a missed SLA alert is received, or other external event is observed, then an observed difference from the initial time estimate has occurred and updated subestimate is necessary. To determine a time difference or delta in time, an estimate differential module 308 may exist which can determine the difference between the original time estimate and the observed time and surface a notification or other update which provides the dynamic time estimate. In addition, inputs received from the monitoring tool 220 may be used to compute the differential and updated the estimated time of arrival as the process continues to move through the lifecycle at the application 210. Simultaneously or in addition, the updates may continuously stored and tracked by the secure database 216.

As indicated, SLAs may be missed and may require partner notification. To determine if an SLA is missed and/or to determine what the SLA is for a given partner 206, an SLA tool (not shown) may also exist and be available for use by the estimates service module 214. The SLA tool may be used in conjunction with at least the job scheduler module 306 and/or the estimate time of arrival 304 to identify and alert when an estimate is delayed. In some embodiments, hardcoded timers may exist which can cause a status to automatically update. In other instances, the real-time and observed time may be computed and updated to avoid automatic updates that would not catch a delay otherwise.

Figure 4B:
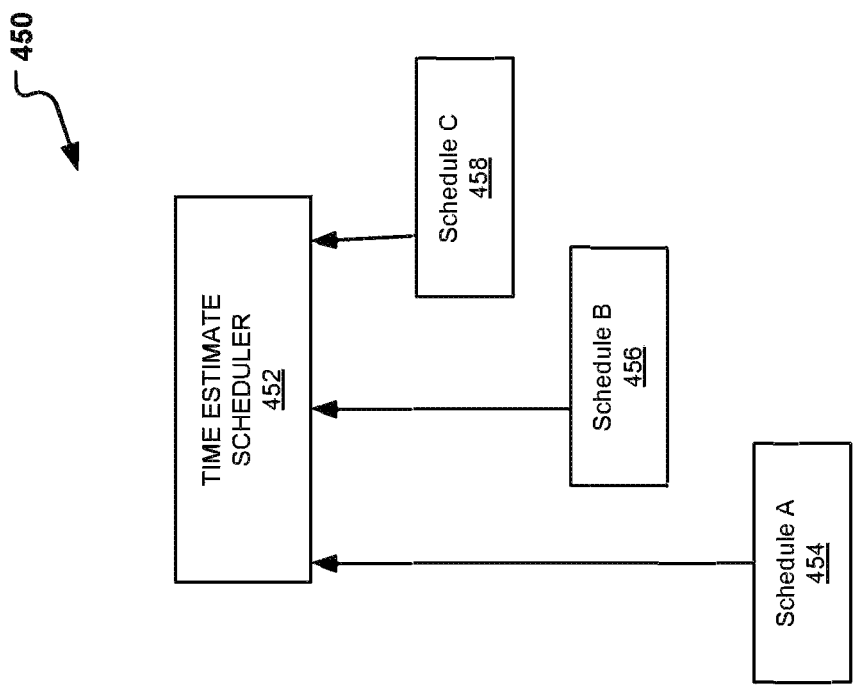
FIGS. 4A-4B illustrates exemplary block diagrams of a scheduling scenarios for use in obtaining dynamic timing estimates.
Figure 4A:
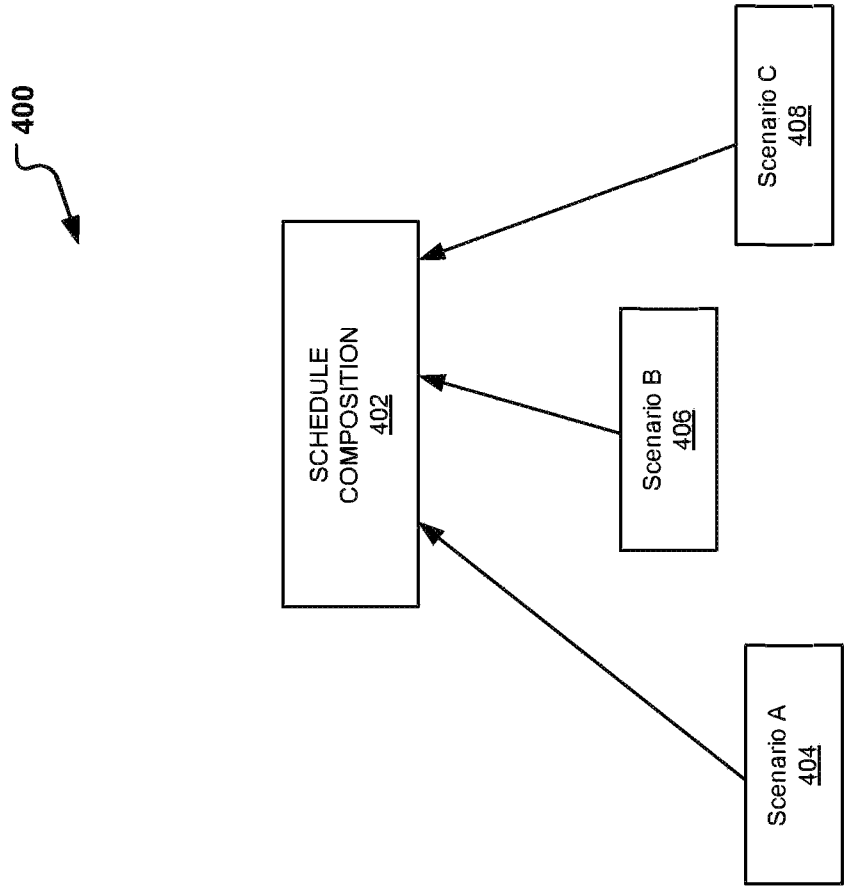

To determine how jobs are broken down into a series of steps or processes consider FIGS. 4A-4B. In particular, FIGS. 4A-4B illustrate exemplary block diagrams of a scheduling scenarios for use in obtaining dynamic timing estimates. As indicated, a user 202-208 may indicate the task performed by an application 210 and an operator 224 and/or a configuration tool 218 may be used to determine the configurations available to perform the task and the corresponding steps or processes associated with the configurations determined. In some embodiments, an application may support multiple and different tenants to reuse its infrastructure for performing a task (e.g., payment processing). To enable the use of a single infrastructure, the estimation platform 222 is enhanced with the capacity to perform estimates that are configurable for the various tenants even if and when a single application 210 is used.

Illustrated at FIG. 4A, is a composite time estimate flow 400 wherein multiple tenants are available to use with a common infrastructure. To provide the dedicated time estimates regardless of the tenant involved, a schedule composition mechanism 402 may exist that allows for various scenarios 404-408 (e.g., tenants) to be added, identified, and schedules tailored based on the scenario 404-408 selected, even if within a single application 210. The schedule composition mechanism 402 may include a composite table that considers the various scenarios for the various operations and schedules associated with each step used with each scenario. For example, consider a payment processing scenario where a payment provider application is being used. Conventionally, this payment provider and corresponding application 210 may be designed for international monetary transfers. As such, scheduling and timing may correspond to a first scenario (e.g., tenant 404, Xoom), wherein scheduling is mainly centered around the transfer of funds and the timing associated with the receipt of the funds. As the money moves between the first user account and to the international entity or user, substestimates and steps may be defined for such transfer and the timing associated with it. As changes occur in the timing estimate, then the estimation platform may be used to provide update as described above and in conjunction with FIGS. 2-3.

In one embodiment, the payment provider infrastructure and functionality may be extended for use in making a risk assessment and disbursement. For this use, a second scenario (e.g., Scenario 406, another tenant, PayPal) may be involved and the application 210 infrastructure reused. Such scenario 406 may involve transactions including online purchases, and as such, a distinct schedule and steps may exist where a user's risk is assessed, and payment or disbursement made for the online purchase.

Still in another embodiment, the payment provider infrastructure and functionality may be further extended for use in collections. For this use, a third scenario 408 (e.g., Venmo) may exist wherein the application 210 infrastructure is once again used, but now for paying or requesting funds from another user in a social platform. Again, this scenario 408 will also require a distinct set of steps or processes associated with the request for transfer or payment. Accordingly, timing and configurations will vary and are accounted for on the schedule composition 402. Note that additional tenants and uses may exist for the use of the application 210 and schedule composition 402 and the services and scenarios presented are for exemplary purposes.

Continuing with the example above, consider the payment provider associated with application 210 wherein multiple tenants and/or scenarios 404-408 are possible. Because a payment provider infrastructure is being reused here, there may exist instances where some of the steps and processes may repeat for varying scenarios 402-408. As such, a single time estimate scheduler 452 may be introduced. Turning next to FIG. 4B, a scheduling block diagram 450 incorporating various schedules is presented. The scheduling block diagram 450 includes the time estimate scheduler 452 where schedule A 454, schedule B 456, schedule C 458, etc. are considered and used in providing the initial and dynamic timing estimate for various tenants using a single infrastructure or application 210. Thus, time estimate scheduler 452 may be used for various tenants and for any combination of steps and processes, enabling the mix-and-match of steps and configurations while still providing both the initial timing estimate for the completion of the requested task and the dynamic timing estimates as various in time occur. For example, in consideration of the example above, if a monetary transfer is requested, the time estimate scheduler 452 can consider a risk assessment (and timing), the collection of the funds (and timing) and the transfer of funds or payout (and timing). Together, the steps and schedules (as may have been historically determined, based on an SLA, or as predicted by the job scheduler 306) are composed to generate an overall estimate for the transfer. Note that the time estimate scheduler 452 may also be used for instances where the applications may vary and the timing estimate platform is used to provide the dynamic timing estimate. Accordingly, the timing system 200 provides system and method for obtaining customizable tasks in consideration of varying configurations, tenants, and processes to provide a best initial estimate with continuous monitoring for dynamic time updates.

Figure 5:
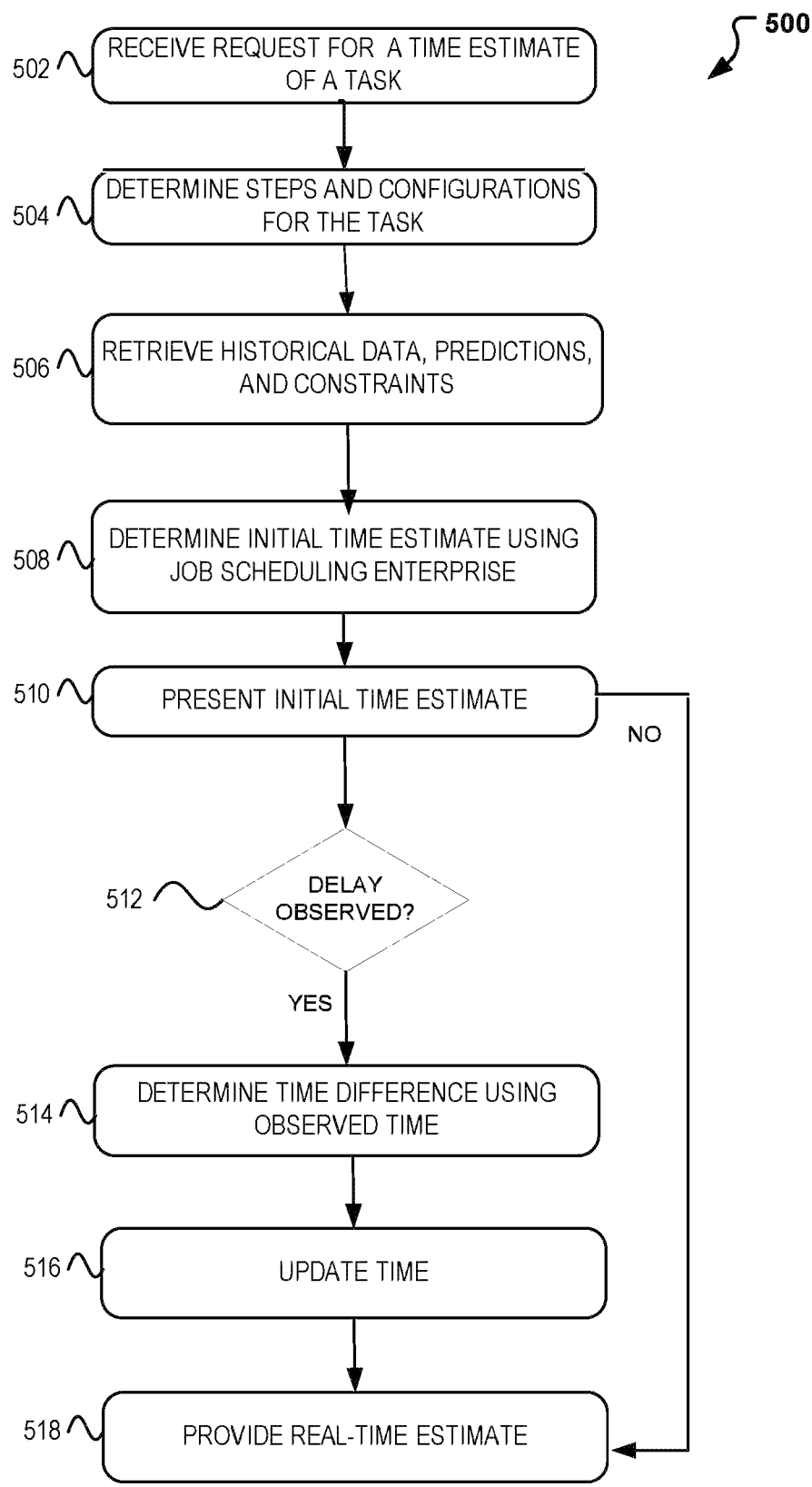
FIG. 5 illustrates a flow diagram illustrating operations for obtaining a dynamic timing estimate.
Figure 6:
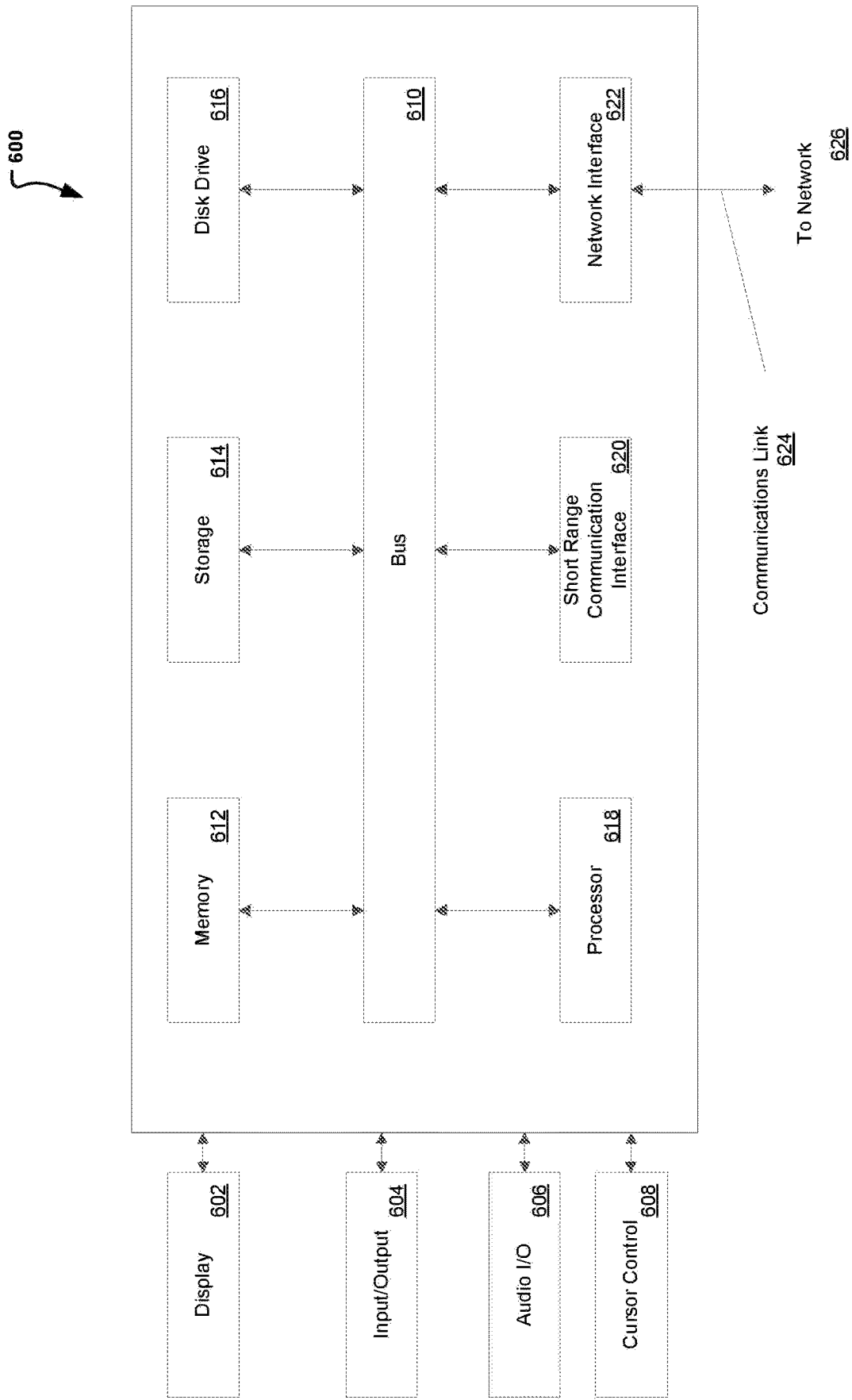
FIG. 6 illustrates an example block diagram of a computer system suitable for implementing one or more devices of the communication systems of FIGS. 1-5.

To illustrate how the timing estimate may be provided, FIG. 5 is introduced which illustrates an example process 500 that may be implemented on a system 600 of FIG. 6. In particular, FIG. 5 illustrates a flow diagram illustrating how the timing system provides an initial best timing estimate and ability to dynamically update timing. According to some embodiments, process 500 may include one or more of operations 502-518, which may be implemented, at least in part, in the form of executable code stored on a non-transitory, tangible, machine readable media that, when run on one or more hardware processors, may cause a system to perform one or more of the operations 502-518.

Process 500 may begin with operation 502, where a request for performing a task and estimating a time is received. The request for the timing estimate may arrive via an input at an application wherein an estimate for a time of completion of the task is desired. For example, a task may include an international transfer of funds, such task includes a timing estimate as to when the funds will be available at a recipient user's account, available for pick-up from an entity, or delivered in-person. The request for the task may include a designation for the type of task and scenario/tenant for the task.

Upon receipt of the request, process 500 continues to operation 504 where the steps, processes and configuration associated with the task are determined. The steps and processes may be determined using at least a configuration tool. In addition, the configuration tool may also be used for obtaining other parameters that may impact the initial time estimate. For example, a holiday, outage, planned delay, store closure, weekend, or the like.

Once the configurations are known for the task requested, historical data, predictions, constraints, and other parameters that impact timing and/or play a role in providing the timing estimate may be retrieved. Such estimates and historical data may be stored and retrieved at least from a secure database, which can also be used to store and track a current task timing and processes of the task for future monitoring. As the historical data and configurations are retrieved, initial time estimates may be determined at operation 508. The initial time estimates may be a combination of substimates for each step or processes of the task. In some embodiments, the timing of a process may be determined using at least a job scheduling enterprise or job scheduler that may reside at least partially within an estimates service module. The job scheduler may be used to simulate a timing of completion of a job without the actual processing of the job. That is to say a job scheduler may be used to simulate a process as if being completed by a partner without having to run the job with the partner. Instead, the job scheduler may be used to provide a prediction on the timing of the job which may be used by the estimates service module for providing consolidated or composed initial timing estimate for the execution of task and its entire lifecycle. Thus, as the substimates are obtained, the consolidated timing estimate may be tabulated and presented on the application and to the user at operation 510 as an initial time estimate.

As process 500 continues, a monitoring tool within the estimation platform may continue to monitor the execution of each process for use in determining if a delay, at operation 512, in execution exists. Delay in execution may exist as an observed time of arrival or observed time estimate is determined and an estimate differential determine. As such, if a delay is observed, the difference from an initial time estimate may be measured based on the observed time recorded at operation 514. At operation 516 the new dynamic and updated time estimate is determined and presented to the user at operation 518. Similarly, if no delay is observed during execution at operation 512, the real-time estimate is provided to a user on the application at operation 518.

Note that these operations are presented as exemplary processes and more or less operations may be involved in the process. In addition, the order of the operations and iteration of the features may occur during other operations and in some instances in parallel while the current process is taking place. For example, in one embodiment, a communication may be received from an application for a request of a time estimate for a task. For the request, the configuration tool may determine various configurations available for performing the task from the request. In response, the best combination of steps from the configurations for completing the task designated for the time estimate may be selected and in response the job scheduling enterprise may provide a time estimate for each step in the best combination identified. In return, the summation or composite estimates may then be determined.

FIG. 6 illustrates an example computer system 600 in block diagram format suitable for implementing on one or more devices of the system in FIGS. 1-5 and in particular timing system 200. In various implementations, a device that includes computer system 600 may comprise a personal computing device (e.g., a smart or mobile device, a computing tablet, a personal computer, laptop, wearable device, PDA, or other computing device) that can communicate with a network 626. A service provider and/or a content provider may utilize a network computing device (e.g., a network server) capable of communicating with the network. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 other devices, such as another user device, a merchant server, an email server, application service provider, web server, a payment provider server, and/or other servers via a network. In various embodiments, such as for many cellular telephone and other device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612 (e.g., for engagement level determination). Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short-range communications interface 620. Short range communications interface 620, in various embodiments, may include transceiver circuitry, an antenna, and/or waveguide. Short range communications interface 620 may use one or more short-range wireless communication technologies, protocols, and/or standards (e.g., Wi-Fi, Bluetooth®, Bluetooth Low Energy (BLE), infrared, NFC, etc.).

Short range communications interface 620, in various embodiments, may be configured to detect other devices (e.g., device 102, secondary user device 104, etc.) with short range communications technology near computer system 600. Short range communications interface 620 may create a communication area for detecting other devices with short range communication capabilities. When other devices with short range communications capabilities are placed in the communication area of short-range communications interface 620, short range communications interface 620 may detect the other devices and exchange data with the other devices. Short range communications interface 620 may receive identifier data packets from the other devices when in sufficiently proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short-range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a processor; and
a non-transitory memory having stored thereon instructions that are executable by the processor to cause the system to perform operations comprising:
receiving, from an application executing on a user device, a request for a time estimate associated with a task;
determining a plurality of potential steps associated with executing the task;
determining an estimated completion time for the task by:
predicting a time estimate for each step of the plurality of potential steps;
selecting, from the plurality of potential steps, a shortest combination of steps comprising two or more steps; and
aggregating the respective time estimates for each step of the shortest combination of steps;
sending, to the application executing on the user device, the estimated completion time for the shortest combination of steps and information associated with the shortest combination of steps to execute the task;
identifying a delay in the shortest combination of steps;
updating, based on the identified delay, the estimated completion time for the shortest combination of steps; and
sending, to the application executing on the user device, a notification of the identified delay and the updated estimated completion time.

2. The system of claim 1, wherein the estimated completion time is a first shortest estimated completion time for performing the task, and wherein the operations further comprise:
determining, based on the predicted time estimates for each step of the plurality of potential steps, a second shortest estimated completion time for performing the task; and
sending, to the application executing on the user device, information associated with the second shortest estimated completion time.

3. The system of claim 1, wherein the information associated with the shortest combination of steps includes: a status of each step of the shortest combination of steps and the respective time estimates for each step of the shortest combination of steps.

4. The system of claim 1, wherein predicting the time estimate for each step of the plurality of potential steps further comprises:
retrieving and analyzing one or more parameters associated with the task, the parameters including at least one of: historical data associated with one or more previous performances of the task, a holiday, an outage, a planned delay, or a day of a week.

5. The system of claim 1, wherein the operations further comprise:
determining, in real-time, that at least one step of the shortest combination of steps exceeds the respective time estimate predicted for the at least one step; and
sending, to the application executing on the user device, an alert notifying a user of the user device that the at least one step exceeds the respective time estimate predicted for the at least one step.

6. The system of claim 1, wherein the identifying the delay in the shortest combination of steps is performed in real-time.

7. The system of claim 6, wherein the respective time estimates for each step of the shortest combination of steps are previous time estimates, and wherein updating, based on the identified delay, the estimated completion time for the shortest combination of steps further comprises:
recalculating the respective time estimate for at least one step, of the shortest combination of steps, affected by the delay; and
determining, for the at least one affected step, a time difference between the recalculated time estimate and the respective previous time estimate.

8. The system of claim 1, wherein the task is an item delivery from a first geolocation to a second geolocation, and wherein the plurality of potential steps tracks movement of the item from the first geolocation to the second geolocation.

9. A computer-implemented method comprising operations including:
receiving, from an application executing on a user device, a request for a time estimate associated with a task;
determining a plurality of potential steps associated with executing the task;
determining an estimated completion time for performing the task by:
predicting a time estimate for each step of the plurality of potential steps;
selecting, from the plurality of potential steps, a combination of steps comprising two or more steps; and
aggregating the respective time estimates for each step of the combination of steps;
sending, to the application executing on the user device, the estimated completion time for the combination of steps and information associated with the combination of steps to perform the task;
identifying, in real-time, a delay in the combination of steps;
updating, based on the identified delay, the estimated completion time for the combination of steps; and
sending, to the application executing on the user device, a notification of the identified delay and the updated estimated completion time.

10. The computer-implemented method of claim 9, wherein the information associated with the combination of steps includes the respective time estimate for each step of the combination of steps.

11. The computer-implemented method of claim 9, wherein the task is a fund transfer from a first user account to a second user account, and wherein the plurality of potential steps comprises at least one of a collection of funds from the first user account and a payout of funds to the second user account.

12. The computer-implemented method of claim 9, wherein the task involves processing a payment transaction, and wherein the plurality of potential steps comprises at least one of: a risk assessment associated with processing the payment transaction and a disbursement made for the payment transaction.

13. The computer-implemented method of claim 9, wherein the operations further comprise:
   determining, in real-time, that at least one step of the combination of steps exceeds the respective time estimate predicted for the at least one step; and
   sending, to the application executing on the user device, an alert notifying a user of the user device that the at least one step exceeds the respective time estimate predicted for the at least one step.

14. The computer-implemented method of claim 9, wherein the notification includes a reason for the identified delay.

15. The computer-implemented method of claim 14, wherein the respective time estimates for each step of the combination of steps are previous time estimates, and wherein updating, based on the identified delay, the estimated completion time for the combination of steps further comprises:
   recalculating the respective time estimate for at least one step, of the combination of steps, affected by the delay; and
   determining, for the at least one affected step, a time difference between the recalculated time estimate and the respective previous time estimate.

16. A non-transitory machine-readable medium having instructions stored thereon that are executable by a processor to perform operations comprising:
   receiving, from an application executing on a user device, a request for a time estimate associated with a task;
   determining a plurality of potential steps associated with performing the task;
   determining an estimated completion time for performing the task by:
      predicting a time estimate for each step of the plurality of potential steps;
      selecting, from the plurality of potential steps, a combination of steps comprising two or more steps based on one or more parameters; and
      aggregating the respective time estimates for each step of the combination of steps;
   sending, to the application executing on the user device, the estimated completion time for the combination of steps and information associated with the combination of steps to perform the task;
   identifying, in real-time, a delay in the combination of steps;
   updating, based on the identified delay, the estimated completion time for the combination of steps; and
   sending, to the application executing on the user device, a notification of the identified delay and the updated estimated completion time.

17. The non-transitory machine-readable medium of claim 16, wherein the one or more parameters include at least one of historical data associated with one or more previous performances of the task or scheduling data.

18. The non-transitory machine-readable medium of claim 16, wherein the combination of steps is a first combination of steps, and wherein the operations further comprise:
   selecting a second combination of steps based at least on the identified delay; and
   sending, to the application executing on the user device, information associated with the second combination of steps.

19. The non-transitory machine-readable medium of claim 16, wherein the respective time estimates for each step of the combination of steps are previous time estimates, and wherein updating, based on the identified delay, the estimated completion time for the combination of steps further comprises:
   recalculating the respective time estimate for at least one step, of the shortest combination of steps, affected by the delay; and
   determining, for the at least one affected step, a time difference between the recalculated time estimate and the respective previous time estimate.

20. The non-transitory machine-readable medium of claim 16, wherein the task is an item delivery from a first geolocation to a second geolocation, and wherein the plurality of potential steps tracks movement of the item from the first geolocation to the second geolocation.

* * * * *